March 7, 1944. J. W. BRYCE 2,343,397
PHOTOGRAPHIC RECORDER FOR ACCOUNTING MACHINES
Filed Feb. 29, 1940 11 Sheets-Sheet 1

James W. Bryce
INVENTOR.
BY Cooper, Kerr & Dunham
ATTORNEYS

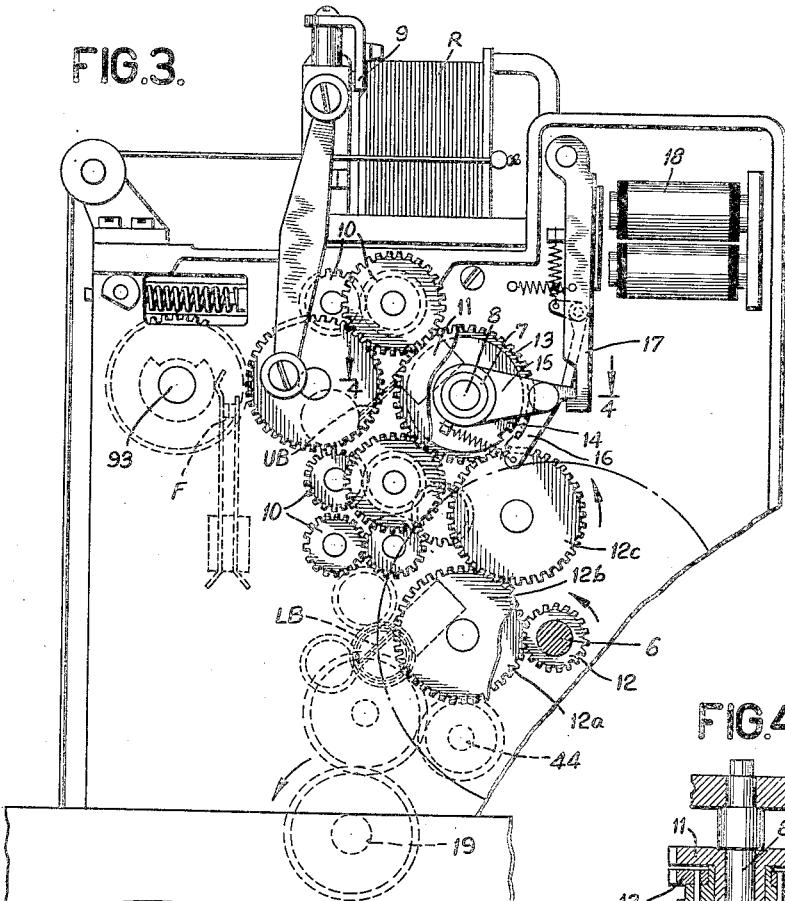
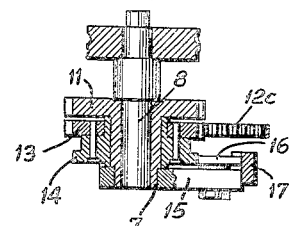
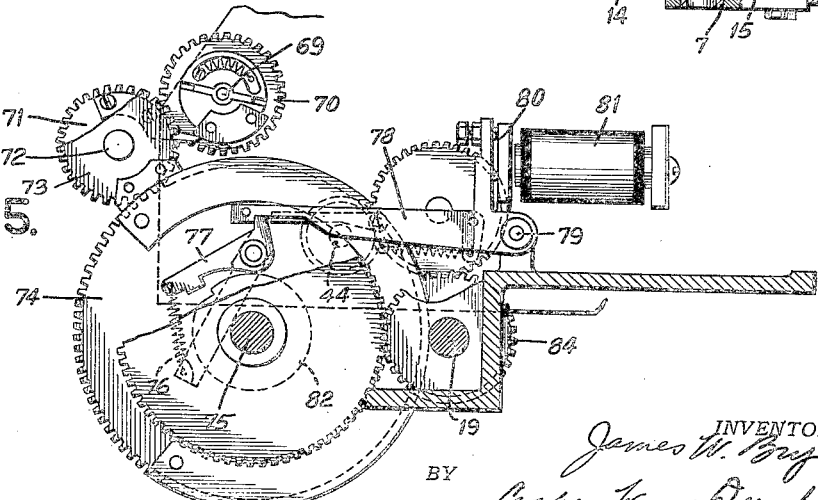

March 7, 1944. J. W. BRYCE 2,343,397
PHOTOGRAPHIC RECORDER FOR ACCOUNTING MACHINES
Filed Feb. 29, 1940 11 Sheets-Sheet 3

INVENTOR.
James W. Bryce
BY
Cooper, Kerr & Dunham
ATTORNEYS

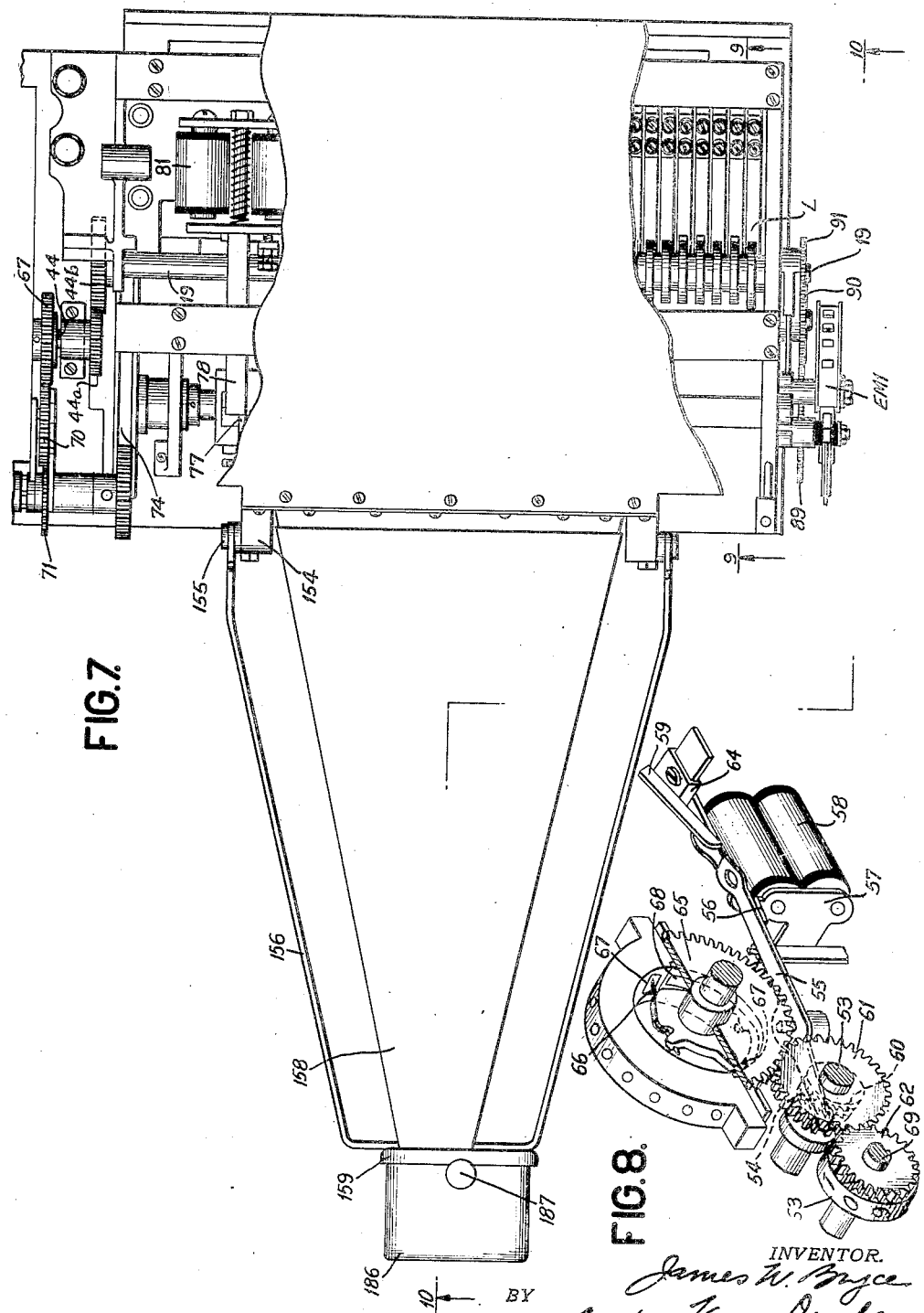

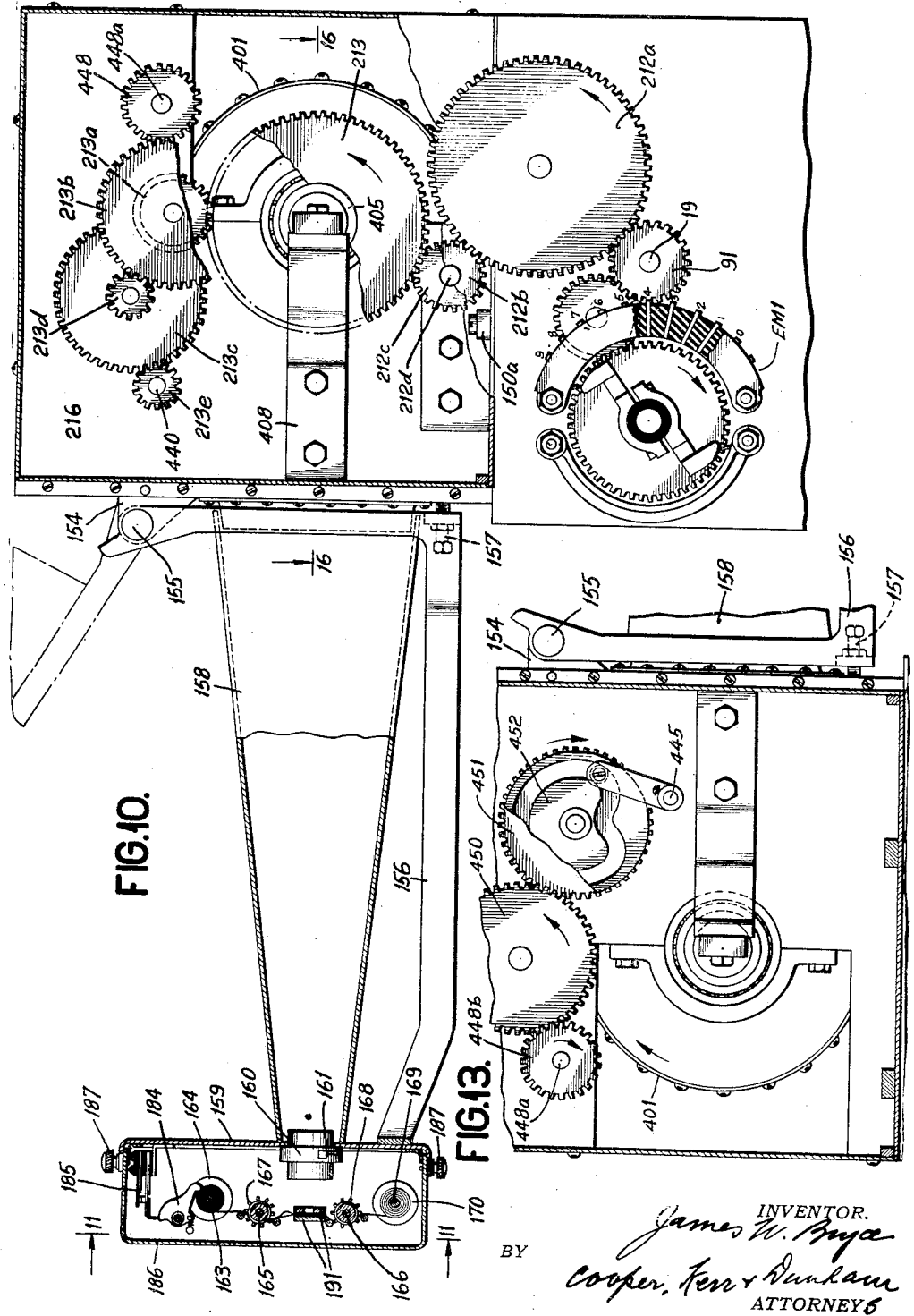

March 7, 1944.    J. W. BRYCE    2,343,397
PHOTOGRAPHIC RECORDER FOR ACCOUNTING MACHINES
Filed Feb. 29, 1940    11 Sheets-Sheet 6

INVENTOR.
James W. Bryce
BY Cooper, Kerr & Dunham
ATTORNEYS

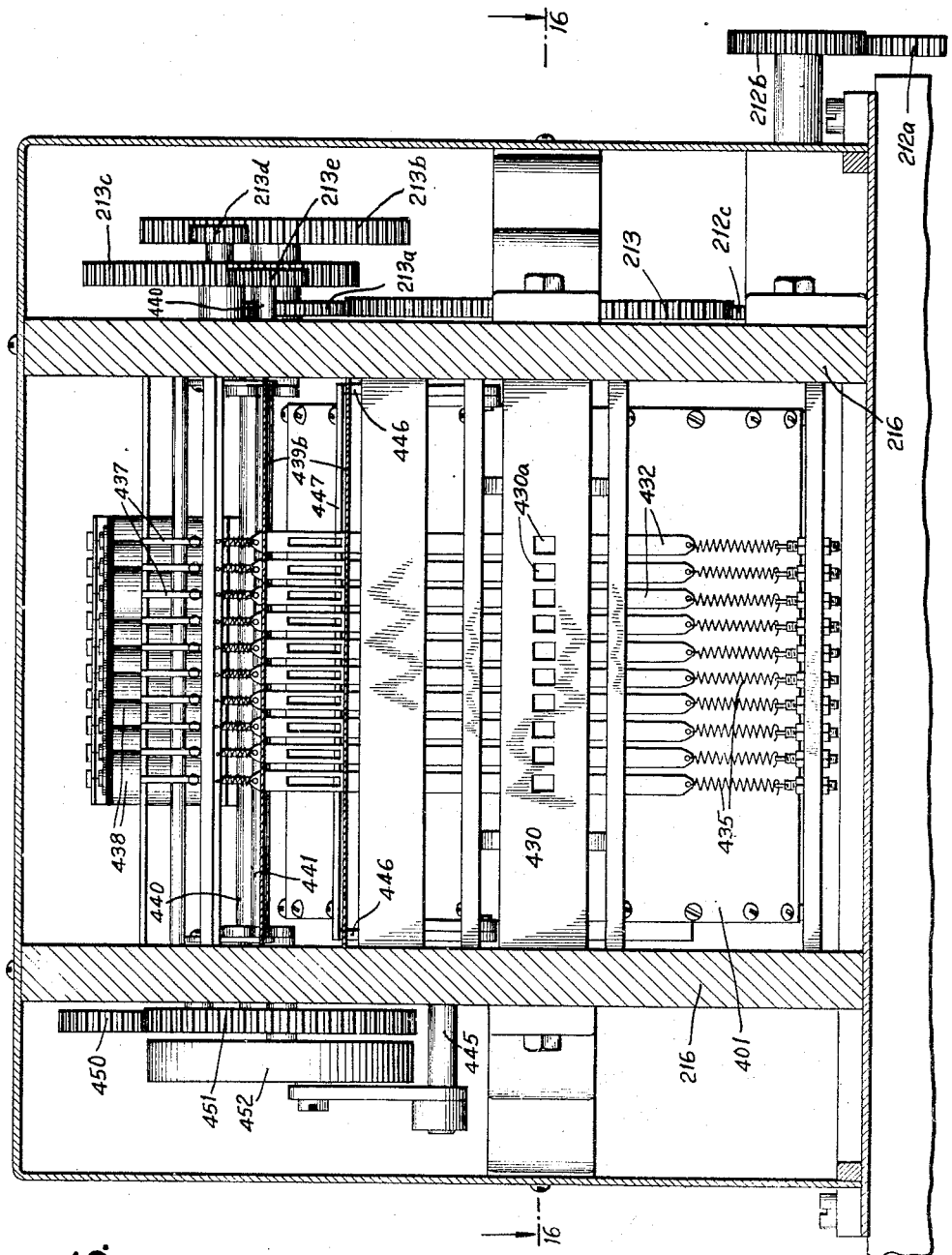

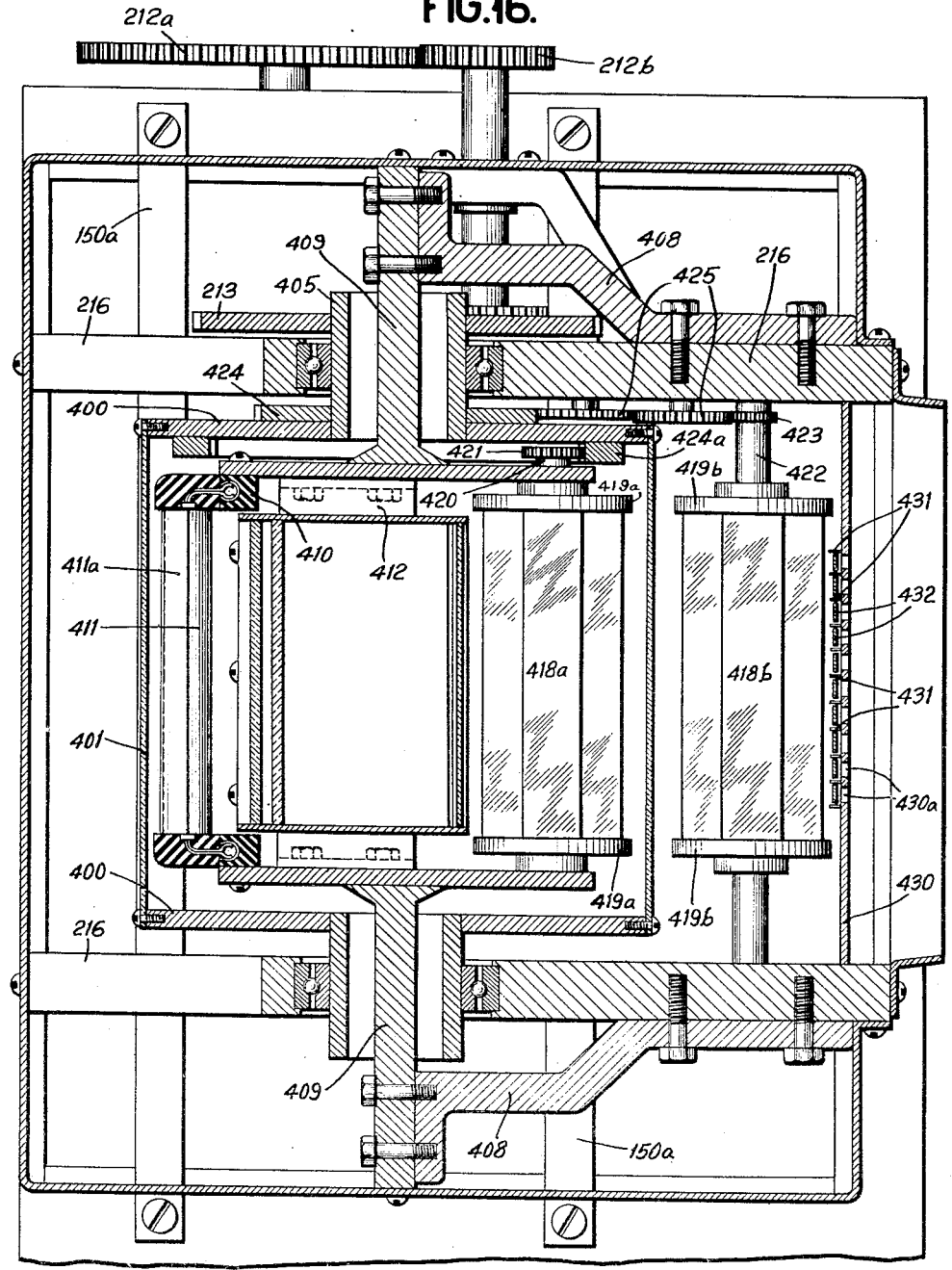

March 7, 1944. J. W. BRYCE 2,343,397
PHOTOGRAPHIC RECORDER FOR ACCOUNTING MACHINES
Filed Feb. 29, 1940 11 Sheets-Sheet 10
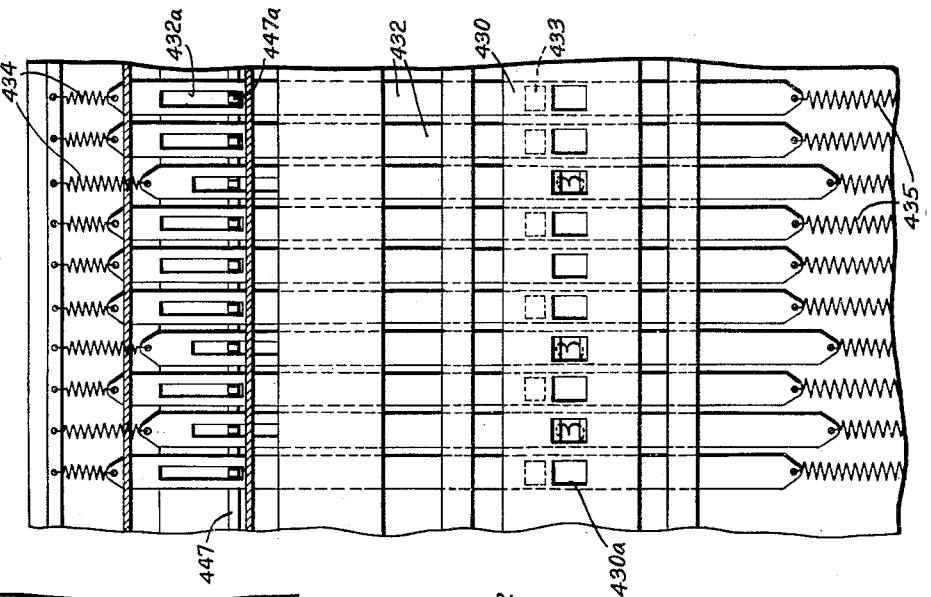
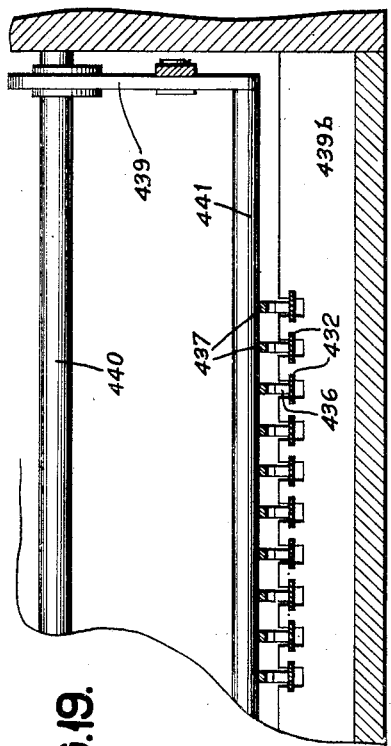
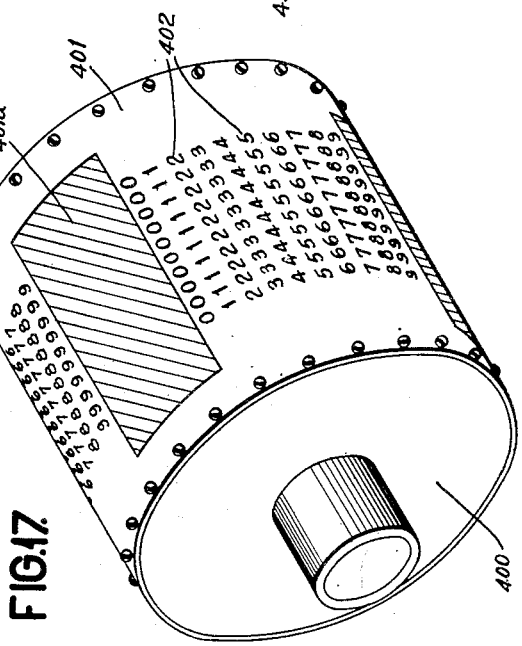
INVENTOR.
James W. Bryce
BY Cooper, Kerr & Dunham
ATTORNEYS Patented Mar. 7, 1944

2,343,397

UNITED STATES PATENT OFFICE 2,343,397

PHOTOGRAPHIC RECORDER FOR ACCOUNTING MACHINES

James W. Bryce, Glen Ridge, N. J., assignor to International Business Machines Corporation, New York, N. Y., a corporation of New York Application February 29, 1940, Serial No. 321,391

13 Claims. (Cl. 95—4.5)

This invention relates to improvements in recording units for accounting machines.

Present day record controlled accounting machines as now commercially used are provided with recording apparatus in the form of printing devices which are provided with large numbers of types, type carriers, platens and attendant driving and differential control devices. Speed of operation of these machines is limited because of the weight of the moving parts. The accelerating, decelerating, starting and stopping of the large number of mechanical parts involved give rise to considerable noise as well as limiting the possible speed of operation. In fact the actual type striking printing operation of such machines gives rise to objectionable noise. Former machines also were subject to considerable wear in the printing mechanism.

The present invention has for its general object the provision of a recording device which will not be subject to the foregoing disadvantages and which will be simple in construction and readily adaptable to the types of machines now in use.

A further object resides in the provision of a recording unit for record controlled accounting machines which will have extreme quietness of operation and yet be capable of high speed operation.

A further object of the present invention resides in the provision of a recording unit wherein the moving parts comprise a continuously movable element such as a rotatable drum and wherein the intermittently operable parts are simple in construction and extremely light in weight.

A further object of the present invention is to provide a non-contact type of recorder in which the character or indication bearing element is in constant unidirectional motion during recording operations.

A further object of the present invention resides in the provision of a photographic recording apparatus wherein data is selectively photographed from a continuously moving data bearing element.

A further object resides in the provision of a photographic recorder provided with an optical compensator for eliminating a possible blur due to motion of the data bearing element during exposure.

It is also an object of the invention to provide a novel method of photo-transferring or transcribing selected accounting data from related columns of data as they move continuously across an exposure station and in such a manner as to selectively photo-transfer some of the data to the exclusion of other data, onto a film.

It is further proposed to effect photo-transference of selected characters from related series of differentially disposed characters onto a film at different points or intervals of a cycle during which the characters of all the series register in succession with an exposure station.

An object is also to provide cyclically operable timing means recurrently effective, once each cycle point to limit the period of exposure of a character during the cycle point to a predetermined portion of the cycle point. In this manner, the images of characters photographed from different columns of characters on a film during a cycle will be reproduced on the film in alignment.

Still another object is to provide a carrier in the form of a rotary drum provided on its periphery with circumferentially aligned separate and successive duplicate series of characters and to move the drum so that the characters of each series will pass an exposure position during one of the successive cycles and in this way enabling each character to lie along an arc closely approximating a flat surface without unduly limiting the length of the character.

Further and other objects of the present invention will be hereinafter set forth in the accompanying specification and claims and shown in the drawings which show by way of illustration a preferred embodiment and the principle thereof and what I now consider to be the best mode in which I have contemplated applying that principle. Other embodiments of the invention employing the same or equivalent principles may be used and structural changes made as desired by those skilled in the art without departing from the present invention and within the spirit of the appended claims.

Description

In the drawings:

Fig. 3 is an outside view of the card feeding and analyzing mechanism. This figure also shows the card feed de-clutching devices;

Fig. 4 is a detail sectional view taken on line 4—4 of Fig. 3;

Fig. 5 is a detail view of the accumulator reset mechanism and clutch therefor;

Fig. 7 is a top view of the recording section of the apparatus with certain cover parts broken away to show the interior construction;

Fig. 8 is an isometric view of certain elements of one denominational order of an accumulator;

Fig. 10 is a partly end elevational and partly sectional view of the recording apparatus, taken substantially on line 10—10 of Fig. 7;

Fig. 13 is a sectional view taken approximately along the line 13—13 of Fig. 1;

Fig. 15 is a detail section taken on line 15—15 of Fig. 14;

Fig. 16 is a detail section taken on line 16—16 of Fig. 10;

Fig. 17 is an isometric detail view of the character drum;

Fig. 18 is a detail view of a portion of Fig. 15 showing the shutter mechanism in action (i. e., in mid-position);

Fig. 19 is a detail sectional view taken on line 19—19 of Fig. 14 and showing details of the shutter mechanism;

General description of the machine

Figure 1:
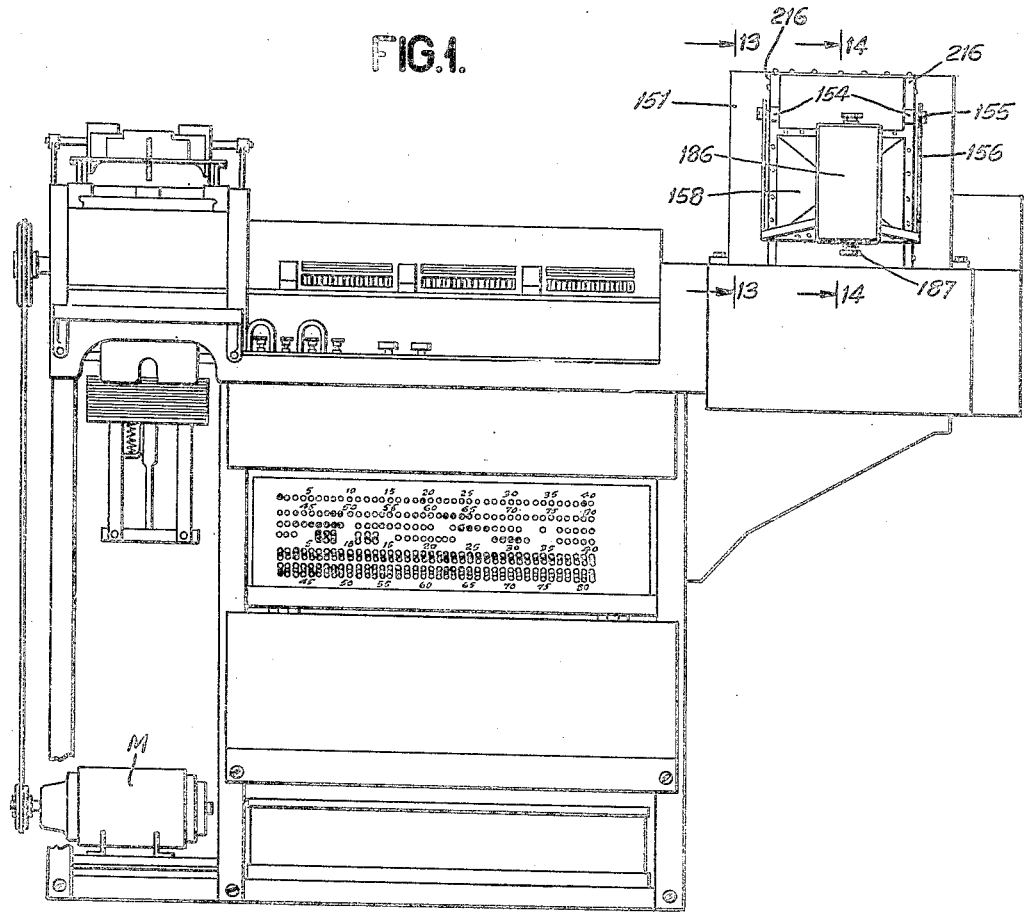
Figure 1 is a front elevational view of the machine.

Before describing the machine in detail, its general features will be briefly pointed out. In lieu of providing a printing type of recorder which utilizes relatively heavy mechanical parts, such as type, type bars, platens, etc., as commonly used to-day in printing devices for accounting machines, according to the present invention there is provided a different form of recorder. This comprises a photographic recording or photo-transferring or transcribing apparatus. Such apparatus includes a continuously movable element or carrier means, preferably in the form of a transparent drum, which carries thereon a series of characters. These characters, according to the disclosed embodiment, comprise the digits from 1 to 9 and 0. However, the invention in its broader aspects is not limited to numerical machines but is adapted to alphabetical machines as well. Provision is made for illuminating the characters on the drum so that they may be photographed. Preferably illumination of the characters is provided for by disposing a light source within the drum and making the drum transparent and the characters opaque. A suitable means is provided for concentrating the light as a beam along a row of characters across the drum. This light then passes through the transparent drum and through the characters which are marked thereon. Such trans-illumination of the characters provides for efficient projection. Obviously, if desired, the drum could be opaque and the characters transparent, but opaque characters are preferred with a transparent drum. In practice, the characters on the drum are disposed in identical sets, side by side and parallel to each other. Each set of characters comprises a series of different characters, i. e., the digits from 9 to 1 and 0. The different characters of each set are differentially disposed peripherally around the drum and the differential disposition of the characters on the drum surface denotes the character or character value. Preferably, in order to have the drum of sufficient size so that it can have within it a light source and other mechanism to be subsequently described, it is provided with several groups of like characters disposed in equidistant zones around the drum. Between each group the drum is made opaque whereby all light transmission is blocked off during the motion of the drum from the terminating point of one character group to the beginning point of the next group.

The driving arrangements of the drum are such that one zone of the drum is traversed for each record handled by the accounting machine. One drum zone is also traversed upon each total taking operation. Provision is made for synchronism of drive between the drum and the accounting machine during listing and total-taking operations.

In order to select the character or characters to be exposed and photographed, or, stated differently, in order to render the photo-transferring means selectively effective or bring it into play for desired characters only, a series of individual shutters are provided between the drum and the film carrying camera. One shutter is provided for each ring of characters on the drum or, otherwise expressed, one shutter is provided for each column of characters on the drum. Provision is made for tripping the shutters at differential times during the continuous rotation of the movable character carrying element or drum. Control of this differential shutter trip is provided from controlled elements of the statistical or accounting machine. Such controlled elements are, as is customary in accounting machines, under the alternate control of the record analyzing means or the data manifesting or representing means, such as an accumulator or accumulators. The controlled elements and the record analyzing or accumulator readout means may be considered as character selecting or translating means for reading out different character call equivalents; for example, character equivalent impulses or electrical character call signals.

Characters are recorded photographically by means of a camera which is suitably focused upon the drum. This camera has the usual lens and carries a roll of film. It is also provided with film devices to provide line by line feed of the film. Data derived from each record as well as total data is exposed upon separate lines on the film.

In use, the device is practically noiseless. It is capable of high speed operation—in fact, very much higher speed than now commercially attainable. Higher speeds are attainable since the drum, which is the only relatively heavy part, is in continuous motion during operations of the accounting machines. The shutter parts are very light and are accordingly capable of very high operating speeds without shock or undue noise. Exposure of the film in the camera is effected with the character carrying drum in continuous motion. Experiment has shown that relatively non-blurred character images may be photographed on the film with the drum in motion at relatively high speeds, but in order to obtain non-blurred images at still higher speeds I preferably provide suitable optical compensating prisms which in effect render each character image relatively stationary during exposure time. Such compensating devices afford clear non-blurred character image exposures on the film at exceedingly high drum speeds.

Restoration of shutters is effected as the drum is passing from one character zone to the other and during the passage of the opaque portion of the drum past the exposure opening.

In addition to the previously described individual column shutters, the camera unit has a main shutter which shutter is opened up at the beginning of a run of records and closed at the end of a run.

The tabulating machine to which the present invention is shown as applied, is generally of the type shown in patent to Lake et al., No. 1,976,617, but modified in accordance with the patent to G. F. Daly, No. 2,126,621. It may be generally explained that with tabulating machines constructed according to the above mentioned Lake et al. patent, two driving motors are employed. One motor drives the card analyzing and accumulating section of the machine and the other motor is employed for resetting and total taking purposes. When such machines are modified according to the construction of the Daly patent, there is provided a single driving motor which is utilized for card feed, accumulator drive and total taking purposes. This modified arrangement requires a clutching device for interrupting card feeding operations without stopping the accumulator drive mechanism.

*General organization of the machine*

Fig. 1 shows the general relation of the units of the machine. At the left is a tabulating machine with the customary card feeding and analyzing mechanism. The center section of the machine includes three accumulators. To the right there is shown the novel recording unit with the photographic recording section. Such section includes the rotating character bearing drum which affords the character or characters to be recorded. Below the accumulators there is the customary plug board.

For convenience in subsequent description corresponding reference letters will be used where possible to correspond with the reference numerals of like parts in the Daly patent.

*Machine drive*

Figure 2:
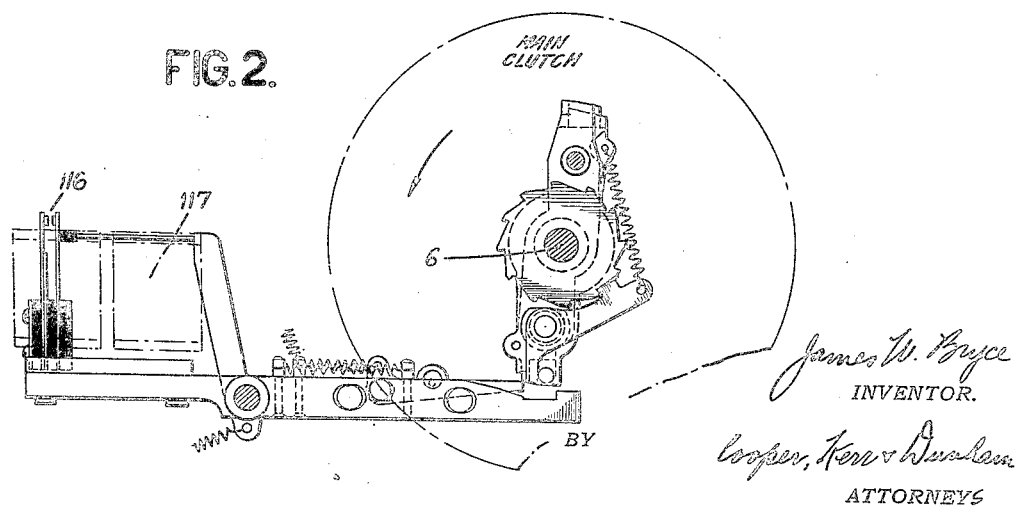
Fig. 2 is a detail view of the main clutch of the machine.
Figures 6, 9:
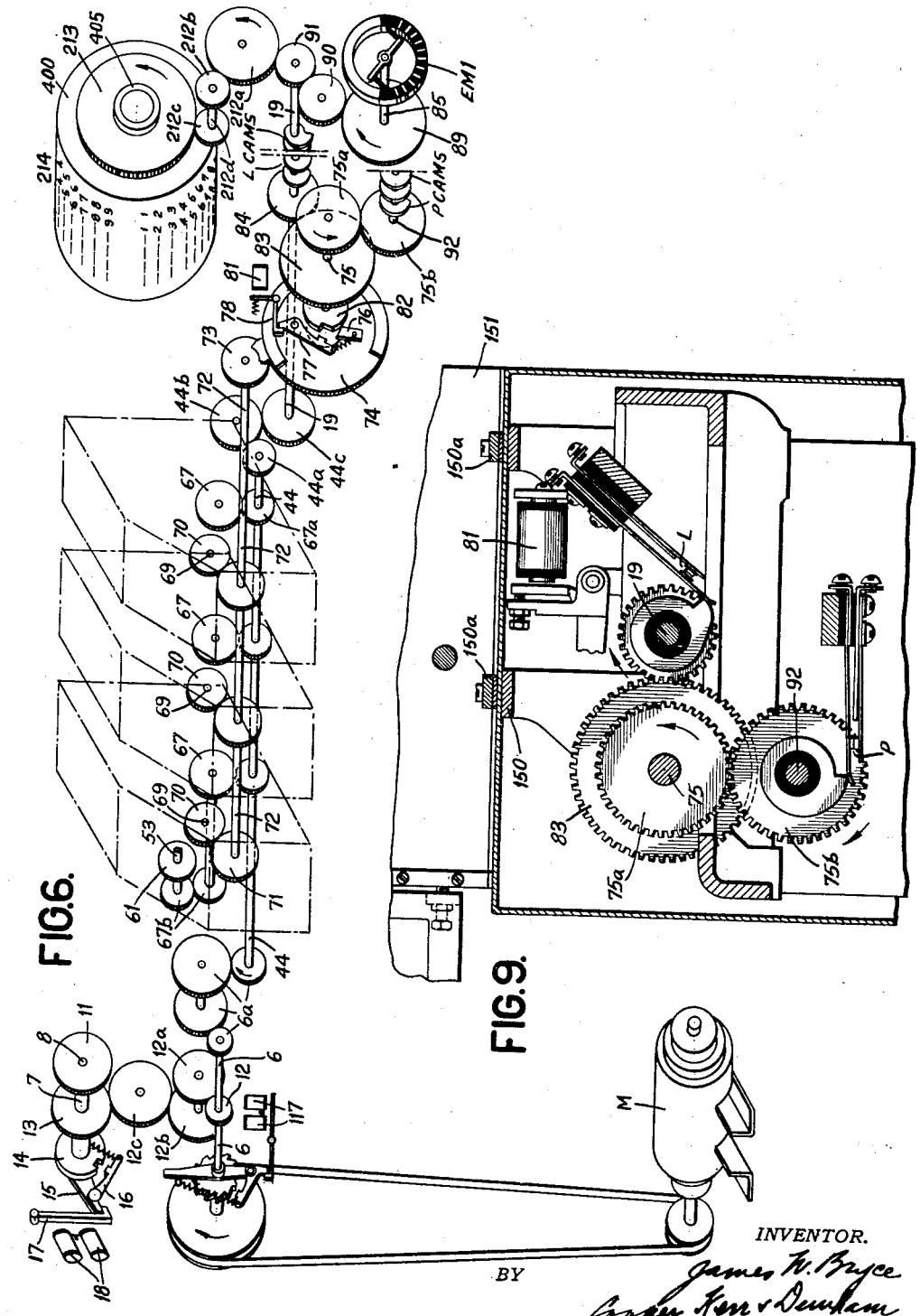
Fig. 6 is a somewhat diagrammatic view of the drive mechanism of the machine.
Fig. 9 is a detail view taken on line 9—9 of Fig. 7.

Referring to Fig. 6, the tabulating motor M, through the usual belt and pulley connection, drives the customary ratchet of the main clutch shown in Fig. 2. When clutch magnet 117 is energized, the shaft 6 is clutched up for drive by the tabulating motor M. Shaft 6 through gearing generally designated 6a in Fig. 6, drives the main shaft 44. Gears 67a on the main drive shaft drive gears 67, one of which is provided for each accumulator. Gears 67 through the shafting and gearing generally designated 67b drive the clutch shaft 53 of each accumulator.

*Drive for resetting and for total recording*

Shaft 44 near its right hand end is provided with a gear 44a which, through gearing designated 44b and 44c, drives a shaft 19. Fixed to shaft 19 is a gear 84 which drives a gear 83 which has clutch driving element 82 integral therewith. Gear 83 is freely rotatable upon a reset-totaling shaft 75. Shaft 75 has fixed to it the gear 74 and an arm 76 (see also Fig. 5) which carries a spring-pressed clutch dog 77 normally held in the position shown in Fig. 5 by a latching arm 78 supported by the armature shaft 79 of magnet armature 80. Energization of reset-totaling magnet 81 will release the dog 77 for engagement with the clutch driving element 82. The gear 74 provides the usual reset drive to main reset shaft 72 through a gear 73 (corresponding to gear 278 of Fig. 26 of the Lake et al. patent). For resetting each individual accumulator, gears 70 are provided to drive the index wheel shaft 69 of each accumulator unit.

From the foregoing it will be understood that reset will be effected in the customary manner on a total-taking operation when totaling magnet 81 is energized.

*Recorder drive*

Referring again to Fig. 6, the gear 91 by means of gearing 212a, 212b, 212c drives a gear 213 secured to the character bearing drum generally designated 214. The drum 214 rotates through one revolution for every three revolutions of the shaft 19.

*Card feed drive*

Main drive shaft 6 (see Fig. 3) through a gear designated 12, drives a pair of gears 12a and 12b which are fixed upon a common shaft. Gear 12b in turn drives a gear 12c which meshes with gear 13 of the card feed unit.

*Card feed and record analyzing mechanism*

Referring to Fig. 3, the usual analyzing brushes are indicated at UB and LB and the record cards are successively advanced from the stack R by picker 9 to pairs of feed rolls 10 which serve to advance the cards past the upper and lower brushes UB and LB in succession. The various card feed rolls are gear driven in unison in the customary manner from a main driving gear 11, freely mounted upon a shaft 8. Sleeve 7 of gear 11 (see also Fig. 4) affords a driving connection from gear 11 to an arm 15 which carries a spring pressed clutching dog 16 normally held in the position shown in Fig. 3 by an armature latch 17 controlled by a card feed clutch magnet 18. Disposed between gear 11 and arm 15 there is a gear 13 and a clutch driving disk 14 freely rotatable upon the sleeve 7. Gear 13 has the drive connection previously described, to gear 12c which in turn, through gears 12b, 12a and 12 is driven from shaft 6.

Referring again to Fig. 3, energization of the clutch magnet 18 will trip dog 16 into engagement with the disk 14 and the card feeding mechanism will cause cards to be advanced past the usual brushes UB and LB. Card feeding and analyzing operations will continue as long as magnet 18 remains energized. Such magnet is de-energized on total taking cycles and card feeding will not occur on such total taking cycles.

Reference may be had to the Lake et al. patent for details of operation of the reset clutch mechanism shown in Fig. 5 and for details of operation of the main clutch mechanism shown in Fig. 2.

*Accumulating mechanism*

The present machine includes three accumulators. Each of these accumulators is of the form fully described in the Lake et al. patent.

The mode of operation of elements of one order may, however, be briefly described as follows:

Referring to Fig. 8, shaft 53 has slidably mounted thereon, but keyed for rotation therewith, a clutch element 54, one for each denominational order of the accumulator. Element 54 is provided with a groove which fits the short arm of a lever 55 pivoted as shown and provided with a block 56 normally latched by armature latch 57 of adding magnet 58. Release spring 59 bears against the extremity of the longer arm of lever 55 and moves the same in a counterclockwise direction upon release of block 56 by armature 57. This movement will bring the clutching member 54 into engagement with cooperating teeth 60 integral with the gear 61, which is freely rotatable on shaft 53. Gear 61 when thus coupled to shaft 53 will rotate a gear 62 and will displace the accumulator index wheel 63. The usual clutch release is provided and comprises a finger 64 to engage the rearward extremity of member 55 towards the end of the cycle for disengaging the clutch element 54 from teeth 60 and relatching block 56 on armature 57.

Briefly summarizing the adding operation, the magnet 58 may be energized at various points in the cycle of the machine (Fig. 21) depending upon the location of a perforation in an assigned column of a record card analyzed by the lower brushes LB. This energization is effective in response to a perforation in any of the index point positions from 9 to 1, inclusive, to cause index wheel 63 to move 9 to 1 steps. A perforation in the "9" index point position will trip the clutch element 54 nine steps before finger 64 is operated to declutch it and a perforation in the "1" index point position will trip the clutch element 54 one step before it is de-clutched by the finger 64. Each step of clutching engagement corresponds to a tenth of a revolution of the accumulator index wheel 63 so that a "9" hole will cause it to move $\frac{9}{10}$ of a revolution and the "1" hole will cause it to move $\frac{1}{10}$ of a revolution.

Readout mechanism

Also driven by gear 61 (Fig. 8) is a gear 65. The ratio of gears 65 and 62 is 2 to 1 so that the former will turn a half revolution for each revolution of the latter. Carried by and insulated from gear 65 is a pair of brush assemblies comprising two electrically connected brushes 66. During one cycle, one of the brushes cooperates successively with ten conducting segments 67 while the other is wiping an arcuate main conducting strip 68. During the next cycle, the brushes reverse their positions and functions. The relationship of the parts is such that when the index wheel 63 is in its zero position, one of the brushes 66 is in contact with the zero segment 67 and the other brush is in contact with common strip 68.

The brushes 66, segments 67 and common strip 68 provide a readout mechanism for reading out amounts standing on the accumulator, an amount being represented by the position of one of the brushes with respect to the segments. The shaft 69 (Fig. 8), upon which the index wheels of an accumulator are freely mounted, is slotted for cooperation with the usual reset pawls (not shown) carried by the individual index wheels in such a manner that counterclockwise rotation of shaft 69 will advance the index wheels 63 to zero position during a single revolution of shaft 69. Reset drive for shaft 69 is provided for in the manner previously described.

Cam contact devices and the cycles

Referring to Figs. 6 and 9, the shaft 19 is adapted to drive certain L cams of the cam contact devices. Ten of such L cams are provided. The same shaft 19 through gearing 91, 90 and 89 drives the emitter drive shaft 85. This shaft drives the usual two brushes of the conventional emitter designated EMI. The two emitter brushes make one revolution for every two revolutions of shaft 19, but during each half a revolution, one of the brushes is successively wiping the emitter spot and the opposite brush is wiping the common segment. Suitable gearing 75a, 75b is provided to drive from reset-totaling shaft 75, a shaft 92 which in turn drives the P cams of the machine. Such P cams rotate through one complete revolution in two machine cycles and function during total taking cycles.

The present arrangement differs from the device of the Daly Patent No. 2,126,621 wherein the P cams make a complete revolution in one machine cycle.

Referring now to Fig. 3, a shaft 93 driven from the card feed gear train operates the F cam contact devices during card feeding cycles only.

Figure 21:
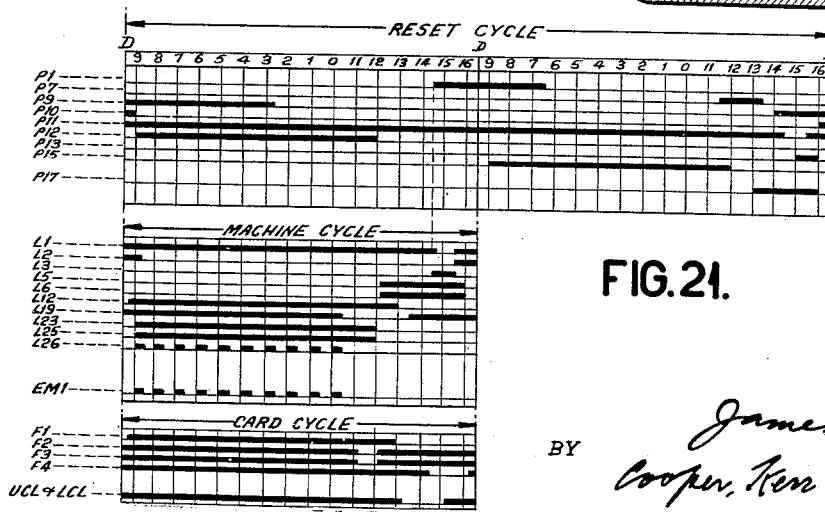
Fig. 21 is a timing diagram showing the timing relation of various cam contacts and other devices in the machine.

The timing relations of the various cam contact devices are substantially shown in detail in the timing diagram (Fig. 21). A card cycle is equal to the period of one revolution of shaft 93 and to the period between the arrival of corresponding points of successive cards at a reference point such as an analyzing station. The card cycle occurs during one machine cycle. During each card cycle, the F cams make one revolution. A machine cycle is equal to a revolution of shaft 19 during which the L cams make one revolution and an emitter brush of emitter EMI is successively wiping the emitter spots. The reset or total cycle occurs when shaft 75 (Fig. 6) makes one revolution as a result of energization of reset magnet 81. The drive relations of machine cycle shaft 19 and reset cycle shaft 75 are such that during one revolution of the shaft 75, there will be two revolutions of shaft 19. Hence each reset cycle is coextensive with two machine cycles. During each reset cycle, the P cams make one revolution.

Camera recording unit

Referring to Figs. 1 and 9, at the right hand end of the machine there are frame parts 150 which afford support for a box-like housing 151 and for a pair of cross-bars 150a (see also Fig. 16). Secured to the cross-bars 150a are a pair of side frame members 216 (see also Figs. 15 and 16). Within the enclosing housing 151 for the photographic recording apparatus is the character bearing drum generally designated 214 (see Fig. 6).

Referring to Fig. 10 the side frames 216 are provided with forwardly extending lugs 154 receiving studs 155 which pivotally support a yoke, in the form of a U-shaped bracket 156 (see also Fig. 7). The yoke normally assumes, by gravity, the full line position shown in Fig. 10, in which position adjusting screws 157 abut the frames 216.

The photographic recording mechanism is in operative position when yoke 156 is in the full line position shown in Fig. 10. When it is desired to directly view the character drum, the yoke or bracket 156 is swung to the dotted line position so that the character bearing drum may be visually inspected.

Referring to Fig. 10, the bracket 156 supports a light-tight funnel 158 which at its left end extends to the back plate 159 of the camera unit. This back plate 159 carries a suitable lens and shutter assembly generally designated 160 and including a shutter trip lever 161.

Figure 11:
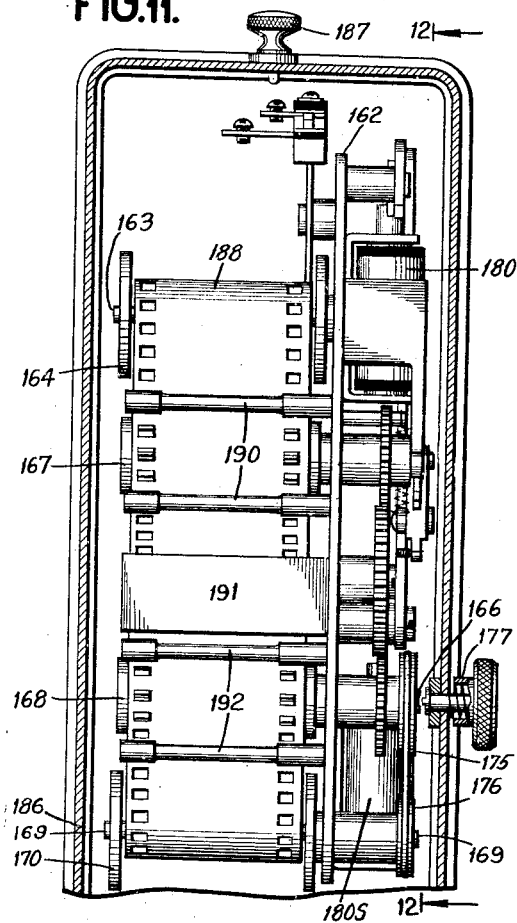
Fig. 11 is an inside elevational view of the photographic recording apparatus. The view is taken substantially on line 11—11 of Fig. 10.

Within the camera device and fixed to the back plate 159 (see Fig. 12) is an assembly plate 162. A stud 163 carried by plate 162 as shown in Fig. 11 affords a support for a film supply spool which is generally designated 164 (see also Fig. 10). A pair of shafts 165 and 166 (Fig. 12) are also rotatably supported by the assembly plate 162 and on these shafts are film feed sprockets 167 and 168 (see Fig. 10). Another shaft 169 affords a support for a take-up spool 170.

Figure 12:
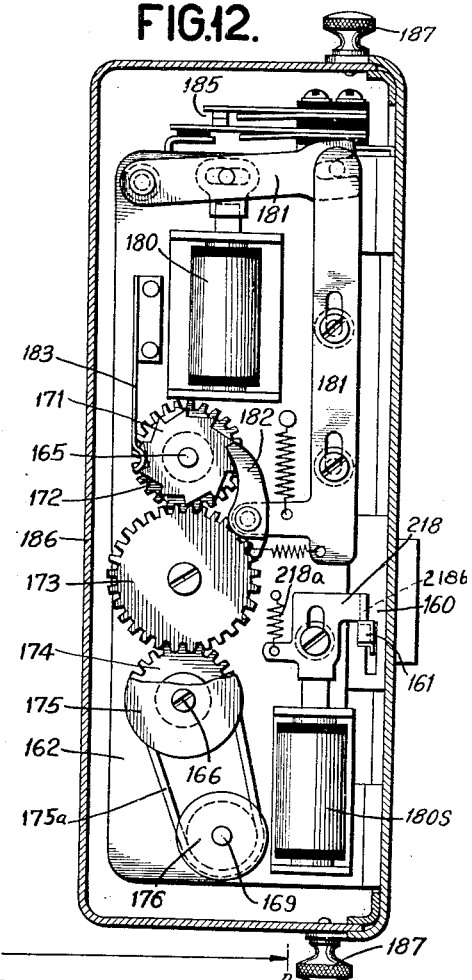
Fig. 12 is a detail sectional view of this apparatus, the section being taken substantially on line 12—12 of Fig. 11.

Referring now to Fig. 12, shaft 165 has fast to it a ratchet 171 and a driving gear 172. Driving gear 172 meshes with an intermediate gear 173 which in turn is meshed with a gear 174 fixed on shaft 166. A belt 175a transmits motion from a pulley 175 fixed to shaft 166, to a pulley 176 on take-up spool shaft 169. Shaft 166 is slotted at one end to receive a winding key generally designated 177, normally in the retracted position, as shown in Fig. 11. Also carried by the assembly plate 162 is a film feed operating solenoid 180, energization of which will depress an actuating member 181. This member 181 is suitably spring-restored to upper position and upon restoring movement, a pawl 182, carried by the member, actuates the film feed ratchet 171 to advance the film one line space. A flat spring 183 serves as a detent for the ratchet 171.

Referring again to Fig. 10, within the camera housing there is provided a pivoted lever 184 which is spring pressed into contact with the film on the supply roll. When the film is exhausted, member 184 swings clockwise to such an extent that a pair of contacts 185 opens. At other times with film available on the supply spool, the lever 184 maintains these contacts closed. The camera unit is provided with a suitable housing or cover designated 186. This cover is held in position on the back plate by a pair of knurled thumb screws 187. The film which is designated 188 in Fig. 11 is provided with the usual feeding sprocket holes. The film passes successively under the first two film guides 190, through a film gate 191 (see Fig. 10), and then under another pair of film guides 192 (Fig. 11). The film guides 190 and 192 and the film gate 191 are suitably mounted on the assembly plate 162. Also carried by the assembly plate is a solenoid 180S (Fig. 12). Fixed to the plunger of the solenoid is a plate 218 which is normally held in upper position by a spring 218a. Plate 218 is provided with a lug 218b engaged with the shutter control lever 161. Upon each energization of the solenoid 180S, the plate 218, through its lug 218b will operate lever 161 to actuate the main shutter mechanism of the camera unit. According to the present arrangement, the main shutter mechanism is set for a so-called time exposure operation, that is to say, the first actuation of member 161 will open the shutter mechanism and the next actuation will close it.

*Rotating character drum and auxiliary shutter mechanism*

Referring to Fig. 6, it will be understood that the character drum 214 is in continuous rotation so long as the main drive shaft 44 is rotating. According to the present embodiment the drum 214 rotates through one revolution during three card analyzing cycles.

Referring to Fig. 17 the drum has two end plates 400. Secured to the end plates 400 is a cylinder or cylindrical chart 401 of suitably transparent or translucent material. While this cylinder may be of glass, it is contemplated and preferred that a synthetic plastic material of suitable transparency be used to avoid any possibility of breakage. Suitably imprinted on the transparent cylinder are opaque digit characters 402. Ten such characters 9 to 0, forming an ordinal digit series or set are conveniently arranged in a column in a field and each character is differentially disposed along the column in the field in a position corresponding to its value. There are three fields of sets of characters following one another around the drum periphery. For simplicity of illustration each of these fields is shown with only ten columns of characters, but in actual practice the number of columns in a field would be increased to whatever degree was desired according to the columnar capacity of the machine. Several columns in each field may have a denominational order value relationship so that a multi-denominational amount may be photographed on a line of the film.

Briefly, it may be explained that each field of characters is acted on during one cycle of a number of successive cycles. Individual shutters are provided, one for each circumferential column-bearing band of the drum, each such band having three duplicate columns, one in each field. By opening an individual shutter at the proper differential time in a cycle, the related digit in a character column will be exposed and selected for photo-transference to the film. Suitable illuminating means is provided within the drum. This in cooperation with a lens system projects character images onto spaced portions of a film line when the shutters are open. Accordingly, by proper timed actuation of the individual shutters in relation to the cycle, any digit values may be projected upon the film or light sensitive element in the camera unit. Film feed is effected at the time an opaque portion 401a of the drum chart 401 is traversing the exposure line. The individual column shutters are also restored at this time. The purpose of the opaque section 401a is to provide cutting off of all light during film feed and during individual shutter restoration.

In detail, the drum 214, as previously described, is driven from gear 91 (Fig. 10) through gearing 212a, 212b, 212c to gear 213. Gear 213 is affixed to a hub 405 on the right hand end plate 400 of the drum (see also Fig. 16). Hubs 405 on the drum are rotatably mounted in the fixed end frames 216, preferably through suitable ball bearings. It is preferred, in order to secure brilliant illumination, to dispose the source of light within the drum. By providing the source of light within the drum, light may be transmitted through the drum chart to brilliantly contrast the opaque characters with respect to the transparent portion of the chart. It is furthermore advantageous to provide the source of light within the drum because this provides proper space outside the drum for disposition of the individual shutters.

Before describing the way in which the light source is mounted within the drum, it may be first explained that it may be desirable to compensate for the motion of the drum during film exposure to avoid any possibility of slight blurring of characters when the device is operated at extremely high rates of speed. Accordingly, there is also provided in association with the drum a system of compensating prisms which will be described later.

Figure 14:
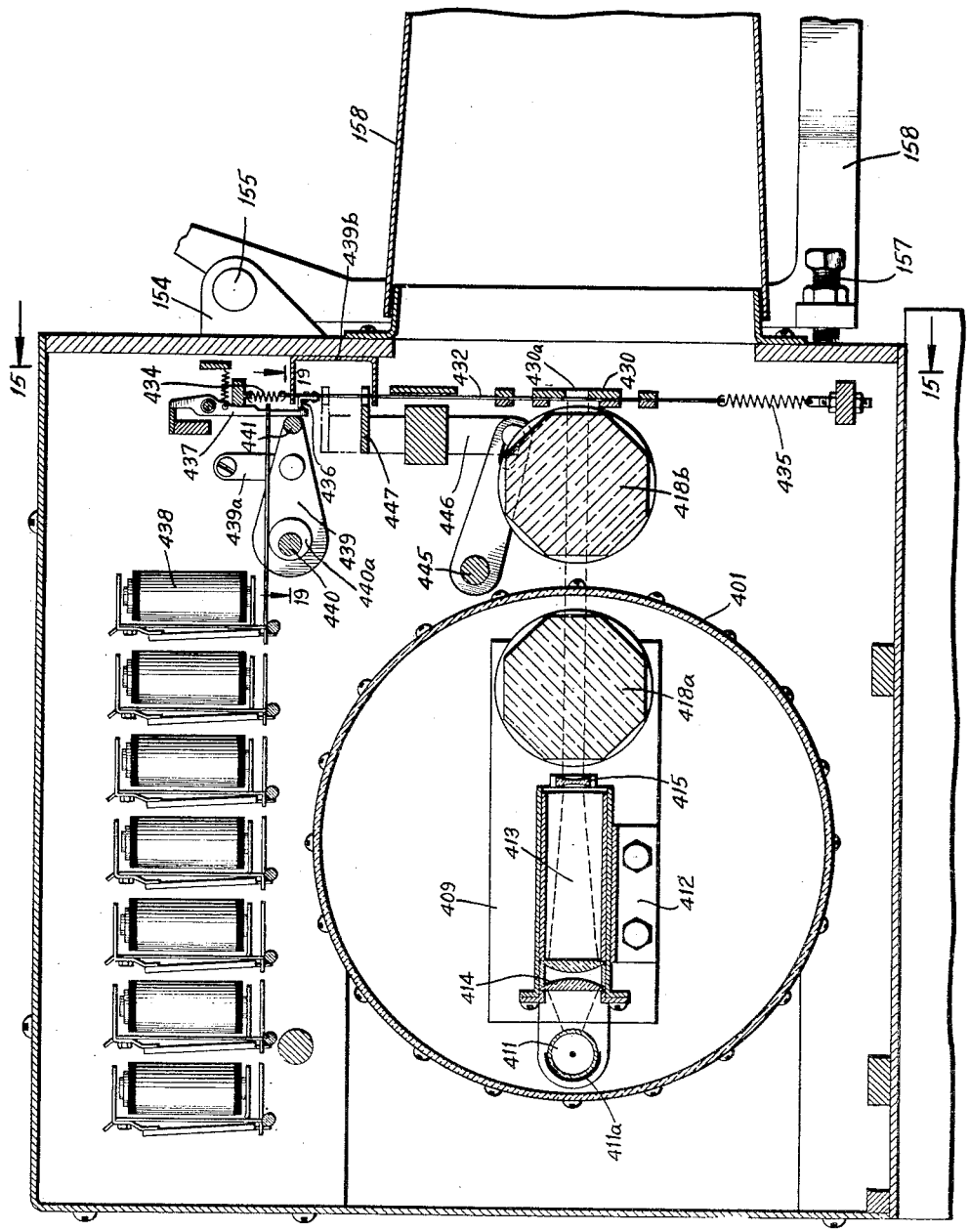
Fig. 14 is a detail sectional view taken on line 14—14 of Fig. 1.

Referring, for the present, to Fig. 16, fast to the opposite side frames 216 is a pair of brackets 408. Secured to brackets 408 are other brackets 409 which extend through the hollow hubs 405 of the drum to a point within the drum. Mounted on the brackets 409 are a pair of terminal sockets 410 for receiving a cylindrical incandescent light generally designated 411. This lamp bulb is of the conventional tubular variety. Preferably the back half of the lamp is silvered as shown at 411a to provide a reflector. Brackets 409 also afford support for a cross-bracket 412. This bracket 412 provides support for a lens system generally designated 413 (see Fig. 14). Such lens system may comprise a pair of condensing lenses 414 to direct the light received from the light source 411 upon a small double concave lens 415. This system of lenses will direct a straight beam of light of proper depth to impinge upon one horizontal row of characters across the drum periphery when the row is at an exposure station. The lens system is also of such character as to direct the rays of light in a substantially parallel direction towards the drum periphery. It will be understood that the lenses used in the system, are preferably, long or so-called cylindrical lenses and, accordingly, the light derived from the light source 411 is focused upon the entire length of the character row at the exposure station.

The compensating means for the image projecting beams comprise prisms 418a and 418b, which are respectively inside and outside the drum. These prisms are of octagonal shape and they are mounted in octagonally recessed end plates. The carrying plates for prism 418a are designated 419a and those for prism 418b are designated 419b (Fig. 16). Right hand end plate 419a is rigidly carried by a shaft 420 which has a gear 421 fast thereto. Gear 421 meshes with an internal ring gear 424a fixed to the right hand side plate 400 of the drum. Right hand end plate 419b is fast to a shaft 422 which has fixed to it a gear 423 receiving drive through idler gears 425 from an external spur gear 424 which is fixed to the right hand side plate of the drum.

It will be clear that through the above gearing both prisms will rotate during rotation of the drum and that their rotation will be synchronous with the rotation of the drum. Drive relations between the drum and the prisms 418 is such that the prisms rotate one-eighth of a revolution during the passage of a character row or line past the beam of light projected from or which emerges from the lens system.

The arrangement of the gearing is, further, such that the prisms rotate in opposite directions. Prism systems of this character are fully described in the United States patent to Hopkins No. 1,204,771. Briefly stated, however, the action of the dual prism system is such that the inner prism during the motion of the drum bends the light beam downwardly and the outer prism corrects this downward motion so that during the interval when the picture is being taken the effect is equivalent to halting the motion of the drum or momentarily arresting the character row at the exposure station. Accordingly, even though the actual object, i. e., the opaque character is in motion, its image while it is being photographed remains stationary during exposure time.

The above correcting prism system is deemed desirable when extremely high speed of operation is desired. In practice, however, such correcting prism systems may be omitted when slower speeds are employed.

Shutter construction

Referring to Figs. 15 and 16, secured to the frame members 216 is a transverse plate 430 provided with a plurality of rectangular apertures 430a. Each aperture is opposite a column band of characters on the drum and defines an exposure position across which the characters 9 to 0 of a column move successively during a cycle. These apertures constitute an exposure station and afford sight openings through which the drum can be viewed either visually or by the camera. Extending from the rear of the plate 430 are comb-like projections 431, serving as side guides for the auxiliary, individual shutters 432. These shutters are vertically disposed strips of thin light material and each strip is provided intermediate its length, with a rectangular exposure slot or opening 433 (Fig. 18). Each shutter is connected at the top to an individual lifting spring 434 and at the bottom to an individual depressing spring 435. Spring 435 is a more powerful spring than spring 434. To retain the shutters in upward or normal position (see Fig. 14), each shutter is provided with a lug 436 engaged by an individual latch 437 adapted to be tripped upon energization of a shutter magnet 438. In order to insure coincidence of time of shutter action a supplemental control is provided. Such supplemental control comprises a pair of arms 439 suspended intermediately by links 439a and oscillated by rotation of sleeves 440a eccentrically carried by a shaft 440. Fixed between the outer ends of the arms 439 is a bar 441 which lies in back of all the shutter latches 437 (also see Fig. 19). Shaft 440 is driven by a gear train including gear 213a—driven from gear 213 of the drum—and gears 213b, 213c, 213d and 213e. The drive ratio is such that bar 441 is moved back and forth for each one-forty-eighth of a revolution of the character drum. Each drum revolution requires three of the machine cycles (see the time chart, Fig. 21) and each cycle is divided into sixteen cycle points or differential intervals; hence the bar 441 makes one oscillation during each cycle point. During any of the first ten points of the cycle, one or more of the characters traversing the exposure station during the cycle point may be selected and photographed. The selection of the characters is effected by energization of the appropriate shutter magnets 438 tending to release the shutter latches 437, but the actual release of the latches is timed by the oscillating bar 441 to occur at a definite time within the cycle point. Thus, if a shutter magnet be energized too early, nevertheless the release of the associated shutter would be timed accurately to occur at the same relative time within a cycle point as the release of other shutters. Accordingly, characters of the different columns of a drum field will be exposed by release of the shutters during the same or different points of a cycle for an equal duration of time and their images transcribed on the film will be of predetermined height and disposed in accurate alignment. Preferably to guide the shutters adjacent the latch point a comb 439b is provided (see Figs. 14 and 19).

It was previously explained that the camera is so located that it is properly focused upon the drum 214. If, for example, it be desired to record the digit 4 from the extreme left hand column of the drum 214, shutter trip magnet 438 of this column will be energized at the 4 index point in the cycle. This will tend to trip the latch 437. Thereafter, when the eccentric 439 moves to the left, the related shutter 432 will snap downwardly under the influence of the strong lower spring 435. This will cause the slot 433 in the shutter to pass the aperture 430a in plate 430. Accordingly, the digit 4 will be exposed upon the film. In a like manner, digits from other columns may be recorded at differential times.

Towards the end of each recording cycle and during the time when the opaque portion of the drum is passing the sign openings, restoration of the shutters will be affected. This is provided for as follows: At such time, the shaft 445 (Fig. 14) is rocked counterclockwise to lift slides 446 carrying a cross-ball 447. Bail 447 has a comb-like edge and the tongues 447a of the comb (see Fig. 18) pass through slots 432a in the shutters 432. Thus any released shutter will be elevated and re-latched by its latch 437. Rocking movement is imparted to shaft 445 in the following manner.

Referring to Figs. 10 and 13, gear 213b drives a gear 448 which is fast to one end of a shaft 448a. At the opposite side of the machine (see Fig. 13), this shaft is provided with a gear 448b which, through an idler gear 450, drives a gear 451 having fast to it a box cam 452. The follower which cooperates with this box cam is connected to shaft 445. The driving relations of the gearing just described is such that cam 452 rotates once for each card cycle of the machine and rocking movement of shaft 445 is effected at the time the opaque portion of the drum is passing the sight openings.

Referring now to Fig. 18, in this view several shutters 432 are shown in partially actuated position, at the moment when their openings 433 are transiently registering with the sight openings 430a of shield 433. The shutters which are partially actuated are in columns 2, 4 and 8 from the left. As shown, with a "3" character now at the exposure station, partially actuated shutters are exposing the digit 3 in all three columns.

General operation of the camera may be summarized as follows: The cover 186 (Fig. 12) is first removed, the camera loaded and the cover replaced. Upon energization of solenoid 180S, the main shutter mechanism is opened. With the main shutter open, when the auxiliary shutters 432 are tripped, a section of the film is exposed. Upon each energization and subsequent deenergization of film feed magnet 180 (Fig. 12), the film is advanced one line space, bringing a new section of unexposed film to the film gate. Eventually, when a series of card handling operations is completed, the main shutter solenoid 180S is again energized to close the main shutter 160. When depletion of the film supply is sensed by lever 184 (Fig. 10) the film lever contacts 185 open, causing machine operation to be interrupted. The operator may then depress the wind-up key 177 and wind up the remaining end section of the film on the take-up reel 170. The film may be then removed and the camera re-loaded.

Each roll of film would then be developed, fixed and dried. Suitable print enlargements of any size or length may be made as desired from such film. Furthermore, duplicate copies in any desired number may be printed. Reversal film may likewise be used if desired. In certain cases, visual film inspecting devices may be used to read the photographed data.

Circuits and operation

The foregoing description has been directed to the mechanical structure and parts for recording digits on the film in the camera unit. Before describing the circuit diagram of the machine and the operation in detail, it may be explained that for a listing operation during which amounts derived from record cards of a run are listed, provision is made for selectively energizing the shutter trip magnets 438 under control of the analyzing devices comprising lower brushes LB (Fig. 20) which analyze the record cards in succession. On the other hand, during a total taking operation, the shutter magnets are connected to the readout devices 66—67—68 (Fig. 8) which are positioned by the accumulators to represent the total of the amounts accumulated from a group of cards.

It will be assumed for the following description that it is desired to list items derived from a stack of pre-punched record cards placed in the supply magazine of the machine. Further, it will be assumed that it is desired to record a total of the amounts accumulated from each group of record cards.

To prepare the machine for the desired manner of operation, plug connections (not shown) are made between plug sockets 238 (top of Fig. 20) and those sockets 237 (lower portion of Fig. 20) associated with the lower brushes LB adapted to sense the card columns bearing the items it is desired to list. Further, plug connections are made from sockets 239 to sockets 240 (upper part of Fig. 20) which connect to shutter trip magnets 438. If it is desired to record the total in the same columns of the film as the listed data, sockets 239a, associated with the total readout commutators, are connected in parallel with sockets 239. If it is desired to record the total in other columns of the film, the sockets 239a are directly connected to the proper sockets 240.

Group control plug connections are made from selected denominational orders of upper brush sockets 241 (lower right of Fig. 20) and the corresponding orders of lower brush sockets 237, respectively to the plug sockets 242 and 243 connected to opposite sides of the proper group control magnets GC. Assuming that group control is to be effected from a section of three card columns, a plug connection is made from a socket 244 of the group control relays to a socket 245 and a switch 246 is thrown to open position, as shown in the lower portion of Fig. 20.

The accumulator magnets 58 (bottom of Fig. 20) are controlled from selected card columns by connecting them to the necessary lower brushes LB by means of plug connections made between lower brush sockets 237 and accumulator magnet sockets 247. For a listing operation, switch 248 (middle of Fig. 20) is turned to the LIST position as shown.

To place current on the opposite sides 250 and 251 of the current line of the machine, the operator closes main line switch 249. When this is done, a relay coil R40 (left side of Fig. 20) is energized because contacts L19, R43d, and P9 are initially closed. With relay coil R40 energized, its contacts R40a (upper left of Fig. 20) are closed and as the L2 contacts are initially closed, a circuit is established through the reset magnet 81 (also see Fig. 5). This results in clutching of the reset shafts 75 and 92 to the main drive. However, the reset means does not go into action yet, because the main drive has not been set in operation. The operator now depresses the reset key to close key contacts 110 (middle of Fig. 20). This results in energizing a relay coil R30 which closes its contacts R30a to complete a circuit from line side 251, through stop key contacts SP1 (right side of Fig. 20), film lever contacts 185, relay contacts R30a, relay coil R25, clutch magnet contacts 116, motor clutch magnet 117, and to the opposite side 250 of the line. When magnet 117 energizes, contacts 116 open, shunting the circuit through relay coil R1 which is thereby energized to close contacts R1a and establish the circuit of motor M. With the motor in operation, the main drive in is action and since reset magnet 81 is energized, the reset cams P (Fig. 6) advance from the start or the D position (Fig. 21). The L cams also rotate because they are on the shaft 19 which is always driven whenever the main drive and motor M are in operation. A reset cycle now takes place and as explained before, there are two machine cycles coextensive with one reset cycle. As soon as the relay coil R25 is energized, it closes contacts R25a to shunt out the reset key relay coil contacts R30a through cam contacts L1. Near the end of the first machine cycle, the L1 cam contacts open but at that time the reset cam contacts P1 are closed and prevent opening of the motor clutch circuit, so that the motor and main clutch continue in operation for the next machine cycle and until the end of the reset cycle. During the reset cycle, contacts P9 open and break the circuit of relay coil R40. Hence, the reset clutch magnet 81 will be de-energized and conditioned to interrupt the reset means at the end of the reset cycle. Towards the end of the reset cycle, contacts P7 close, energizing a relay coil R43 by a circuit extending through P7 (lower left of Fig. 20), coil R43, lower card lever relay contacts LCLb, upper card lever relay contacts UCLb and back to line. Coil R43 closes contacts R43a to shunt contact P7 and establish a stick circuit for R43. Near the end of the second machine cycle, cam contacts L1 open and with reset cam contacts P1 also open and contacts R30a having been previously opened because of release of the reset key, the relay coil R25 and motor clutch magnet 117 are de-energized and the motor circuit broken.

At the end of the above reset cycle, coil R43 is energized, contacts R43d in the circuit of coil R40 are open, and with the latter coil de-energized, its contacts R40b are closed. The operator now depresses the start key to close key contacts 119 completing a circuit through coil R33, contacts R40b, and coil R32. Coil R33 closes contacts R33a which replace contacts R30a in completing the circuit through coil R25 and motor clutch magnet 117, followed by the making of the motor circuit. Coil R32 closes contacts R32a and with contacts R43c now closed, due to energization of coil R43, a circuit is completed through a coil R39 (left side of Fig. 20), through R32a, stop key contacts SP2, contacts R43c, cam contacts P9, to line. Coil R39 closes contacts R39b forming the circuit of card feed clutch magnet 18 (see also Fig. 3). A card cycle now occurs and the first card is fed to the upper brushes. Concurrently with the card cycle, a machine cycle takes place during which cam contacts L1 open, causing the main clutch to disengage and the motor M to stop at the end of the cycle. Near the end of the first card cycle, the first card closes upper card lever contacts 120 to energize coil UCL which closes contacts UCLs to form a stick circuit through cam contacts L5. Coil UCL closes UCLh contacts to form a circuit through main shutter operating solenoid 180S (right center of Fig. 20) and extending through the still closed contacts LCLh. Solenoid 180S (also see Fig. 12) now opens the main shutter of the camera unit as explained hereinbefore.

After completion of the first card cycle, the start key is again depressed to cause the machine to go through a second card cycle. With coil UCL now energized through its stick circuit, contacts UCLb in the circuit of coil R43 are now open but a shunt circuit is maintained through cam contacts F3. During the cycle, the latter open and coil R43 is de-energized, contacts R43c open, breaking the circuit of coil R39 which in turn causes contacts R39b to open and de-energize card feed clutch magnet 18. Also, with coil R43 de-energized, its contacts R43d are closed and upon closure of contacts L19, coil R40 again is energized. Contacts R40a close and when cam contacts L2 close, the circuit of reset magnet 81 is formed and as a result a reset cycle will follow directly after the second card cycle. Toward the end of the second card cycle, the first card closes lower card lever contacts 122 (right center of Fig. 20) to energize coil LCL which is held through stick contacts LCLs and cam contacts L6. Coil LCL now opens contacts LCLh to de-energize main shutter solenoid 180S. Contacts LCLg close and complete a circuit through a relay coil RY, the function of which will be described later. The upper card lever relay coil UCL and the lower card lever relay coil LCL are now energized; their a contacts (upper right of Fig. 20) are closed and maintain a circuit through the main clutch magnet 117 and motor control coil R1 closed until cards are exhausted.

The reset magnet 81 was energized during the second card cycle and a reset cycle automatically follows the second card cycle. It will be recalled that card cycle clutch magnet 18 is now de-energized so that a card cycle and card feed do not occur during the reset cycle. Coil LCL is now energized and contacts LCLd are closed and upon closure of cam contacts P13 the relay coil R100 (lower left of Fig. 20) is energized, the coil R100 is held through stick contacts R100a and cam contacts P11. Previously, during the reset cycle, the contacts P7 were closed and coil R43 was energized. Contacts R43d open and relay R40 remains de-energized, having previously been de-energized by opening of contacts P9. Contacts R40a, therefore, are open and reset magnet 81 is de-energized to stop the reset means at the end of the reset cycle. Also contacts R40b are closed and coil R32 is energized when contacts L3 close. With R32 energized, contacts R32a close and a pickup circuit is made through coil R39 which circuit also extends through the cam contacts P9 and R43c contacts. With R39 energized, contacts R39b close and upon closure of contacts L2, card cycle clutch magnet 18 is energized. Thus, after the second reset cycle, the cards will be fed in succession and analyzed by lower brushes LB for values. It should be noted that when relay coil R100 was energized during the last mentioned reset cycle, it closed contacts R100d, shunting contacts P11 and providing an auxiliary holding circuit for coil RY extending also through stick contacts RYa.

At the beginning of the card cycle, with relay coil R100 energized and its R100b contacts (middle of Fig. 20) closed, a circuit is formed as follows: From line 251 through R100b, switch 248 in list position, a coil J, cam contacts L23, closed contacts P10, film feed magnet 180, cam contacts L25, back to line 250. This circuit remains energized until shortly after sensing of digit positions 9 to 0 of a card is completed. The magnet 180 is then de-energized and the film advances one line space in the camera unit.

Figure 20:
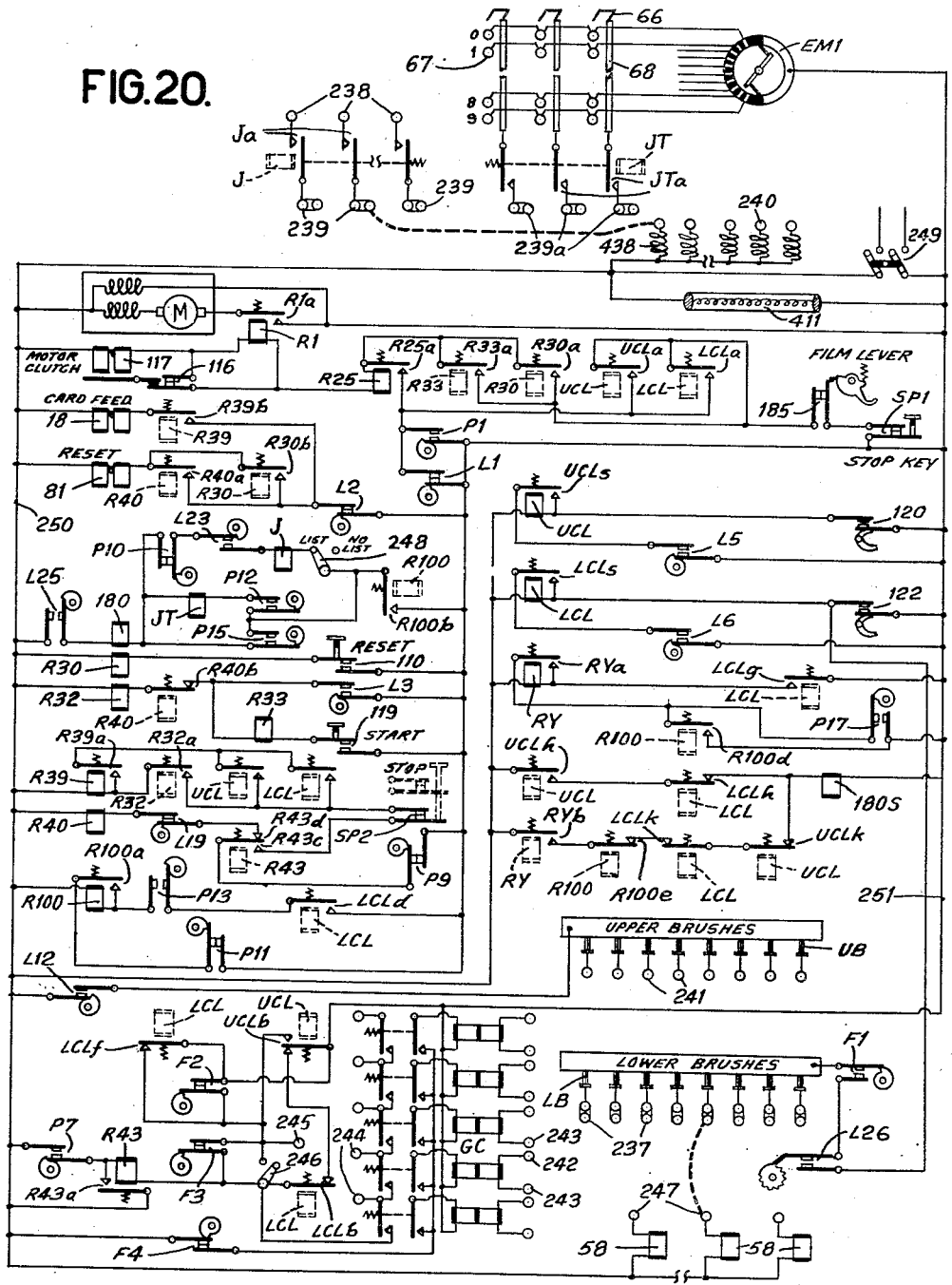
Fig. 20 shows the circuit diagram for the complete machine.

During the sensing of the digit positions, coil J is energized, holding a group of Ja contacts closed to connect sockets 238 and 239 (top of Fig. 20). Let it be assumed that a pair of tens and units card columns are perforated respectively in the "4" and "6" index positions, thus designating value 46. When the "4" perforation is sensed by a lower brush LB, a listing circuit is completed from line 251, through the card lever contacts 122, thence through the customary circuit breaker contacts L26, through cam contacts F1, the contact roll of the lower brushes, the brush sensing the "4" perforation, a plug connection from the 237 socket in the tens order to a selected 238 socket, through a pair of relay contacts Ja, the connected socket 239, a plug connection to a selected socket 240, through the proper shutter trip magnet 438 and back to line 250. It will be appreciated that with magnet 438 energized at the 4 index time in the cycle, the shutter mechanism 432 will be actuated in the manner previously described and the digit "4" recorded on the film in the proper position. In the units order, when the 6 index point traverses the lower brush, a circuit is established via the path previously traced to the contact roll, through the lower brush in the units order, the plug connection from the units order socket 237 to socket 238, through a pair of contacts Ja and through a plug connection between proper socket 239 to socket 240 to energize the shutter trip magnet 438 in the units column. This will cause photographic recording of the digit "6" in the proper position on the film. After sensing of the digit positions, the magnet 180 de-energizes and the film advances one line space, as previously described and during travel of the next card past the lower brushes, a new amount is recorded on the film. Concurrently, with the recording of a card value, an accumulating operation is effected in the following manner. A circuit is completed via the path previously followed to a lower brush plug socket 237, thence through a plug connection to a socket 247, an accumulator magnet 58 and back to the other side of the line 250. Accordingly, as each value from the record card is photographed on the film, it is also accumulated.

Similar card cycles follow for the successive record cards of a group. In each card cycle there is an exposure on the film of digit values derived from the drum. These values are selected according to the impulses differentially transmitted from the card. The transmitted impulses because of their differential timing may be considered as character equivalents for calling characters from the drum for exposure. These operations continue until change in a card group occurs.

When a change in card group occurs, the usual shunt circuit afforded by the group control unit around contacts F3 is broken. This, in a known manner, brings about the de-energization of relay R43 when contacts F3 open and causes operation of the card feed mechanism to be interrupted at the end of this cycle. With relay R43 de-energized, contacts R43d reassume the position shown and a circuit is established through P9 and L19 to energize relay R40. With relay R40 energized, contacts R40 close and reset magnet 81 is energized to cause a reset cycle to follow the last card cycle on a card group.

During the first half of the reset cycle, the total standing in the accumulators is read out and recorded on the film and during the second half the accumulators are reset in the manner explained previously. In the reset cycle, upon closure of contacts P12, a circuit is made through a coil JT and the film feed magnet 180. Since contacts P10 are now open, coil J is de-energized and the contacts Ja are open to isolate the lower brushes from the shutter magnets. With coil JT active, a group of contacts JTa individually connected to the orders of the readout commutator are closed to prepare circuits for differentially operating the shutter magnets according to the total. For example, if digit 4 is in an order of the commutator, a circuit is made at the 4 cycle time as follows: Through the 4 spot of the emitter EM1, the 4 segment of the commutator order, its brushes 66, its common 68, a pair of contacts JTa, connected plug socket 239a, desired plug connection to a selected socket 240, connected shutter magnet 438, and to line. This results in photographing of digit 4 on the film.

After the digit read out period of the reset cycle, contacts P12 open, and coil JT and magnet 180 are de-energized. The de-energization of 180 results in line spacing of the film following recording of the total. To distinctly mark the presence of a total a supplementary line spacing of the film is effected due to energization of coil 180 within the second half of the reset cycle upon the closure of contacts P15 followed subsequently by its de-energization when contacts P15 reopen. This provides a blank space on the film between the total and the first line of items derived from the first card of the next card. The blank space signifies that the preceding line bears a total.

Last card conditions

As usual, in tabulating machines, special controls are provided for the operations pertaining to the last card of a run. Briefly, these may be summarized as follows: When the last card passes the upper brushes, relay UCL is de-energized. This does not occur until cam contacts F3 have opened and re-closed. Upon the next card feed cycle, when the last card passes the lower brushes, the relay R43 is de-energized upon the opening of cam contacts F2 and F3, the UCLb front contacts being opened and the LCLf contacts also being opened at this time.

Coil LCL ultimately de-energizes opening LCLa to interrupt the circuit of clutch magnet 117 and coil R1. The contacts R1a open, breaking the circuit of the motor M. The machine now stops and the last total has to be recorded during a hand-initiated reset cycle such as explained before. Coil R100 is still energized and contacts R100b are closed, so that the circuit of coil JT and magnet 180 is made and causes recording of a total and film feed in the manner previously stated. The supplementary film feed is also effected. After printing of the last total and resetting of the accumulators have occurred, contacts P11 open and de-energize coil R100. Coil RY is maintained energized slightly longer than R100 under control of contacts P17. Accordingly, when contacts R100e close, a circuit is provided as follows: From line 250, contacts RYb now closed, contacts R100e in the position shown, contacts LCLk and UCLk in the positions shown, through shutter trip magnet 180S and back to the other side of line 251. Energization of 189S will close the shutter in the camera unit.

What is claimed is:

1. A recording device for a cyclically operable accounting machine, said machine including differentially operable plural designation control devices, said recording device comprising an illuminated character bearing element, automatic drive devices for moving said element continuously and synchronously in time with the accounting machine, said character bearing element having sets of different characters differentially disposed upon the element in the direction of movement thereof for exposure at differential times, a camera provided with a lens and carrying a film to be exposed to selected characters upon said element, shutter means individual to said sets and operable at differential or concurrent times for selecting which characters from a plurality of said character sets are to be exposed in a common row upon the film, and means for selectively and individually controlling said shutter means from the differentially operable plural designation control means of the accounting machine whereby a plurality of selected characters are exposed upon the film in a common row.

2. A recording device comprising a continuously movable element having parallel sets of characters thereon, the characters in each set being different and each being differentially positioned along the element in the direction of motion thereof in accordance with its value, means to continuously move the movable element, means to trans-illuminate the movable element to provide character outlines in contrast with a background, shutter means, one for each set of characters, a camera unit carrying film to photograph exposed character outlines, and means to operate the shutter means at differential times of a cycle of movement of said movable element to expose selected characters in the different sets to be photographed by the camera unit.

3. A recording device for an accounting machine comprising a continuously movable element bearing a plurality of parallel columns of light-transmitting, differentially disposed character outlines, automatic power means for continuously moving said element to successively and at differential times present different character outlines from each said column at an exposing position and to concurrently present like characters from said column at said exposing position during a cyclic period of movement of the continuously movable element, a photographic apparatus for photographing upon a film character data comprising selected character outlines derived from the movable element, a source of light adapted to direct a beam of light through the movable element to provide character outlines contrasted to a background for exposure, shutter means comprising a plurality of shutters one for each said column at the exposure position and in the path of the light beam and individually operable at differential times to select and expose different character outlines from the element, and means to cause operation of the shutter means at such differential times to select and expose desired character outlines from the movable element.

4. The device according to claim 3, wherein shutter restoring means are provided, with means for operating the same in synchronism with the movable element.

5. A recording apparatus for a record controlled accounting machine, including a rotatable drum which is driven in synchronism with the accounting machine, means for moving said drum continuously during a succession of recording operations, said drum carrying character designations disposed in peripheral parallel columns thereon, means to illuminate the character designations on the drum and display character designations against a contrasting background for exposure, a camera unit having a lens and carrying film in front of said drum, a plurality of shutter devices one for each column of character designations on the drum disposed between the drum and the camera unit and tripping control devices for the shutter devices differentially actuable during continuous motion of the drum for causing selective character designation exposures, said tripping control devices being individual to each shutter.

6. In a photographic recording apparatus, a continuously movable character carrying drum bearing light-transmitting, different character outlines circumferentially spaced on said drum, means to continuously move said drum to cause said character outlines successively to pass an exposure position, illuminating means for trans-illuminating the character outlines as they pass exposure position, a pair of optical rectifying prisms, one within the drum and one without the drum, means to rotate said prisms in opposite directions and in synchronism with the drum to compensate for movement of the drum whereby a character outline at the exposure position is apparently stationary for a temporary period, shutter means timed to operate during such temporary period to expose the apparently stationary character outline, and means for selecting time of operation of the shutter means so as to select and expose desired character outlines.

7. In an accounting system or the like, a movably mounted carrier for plural denominational orders of sets of similar adjacent different value characters, photo-transferring means to transfer images of characters from the several orders of sets to a film line to photographically record a plural order value on the film line, cyclic drive mechanism to move the carrier in a direction to register the different value characters of the several sets with exposure positions during separate differential intervals of a cycle of movement of the carrier and to register like value characters of the several sets concurrently during the same such differential interval, plural orders of exposure devices included in the photo-transferring means and selectively operable during the cycle to cause the photo-transferring means to be effective during any of the differential intervals to transfer characters, one from each set, to the film line, and control means for the devices selectively responsive to different value equivalents of a plural order value for selectively operating the devices to cause the photo-transferring means to be effective during the separate intervals in which the characters of the several sets comprising the value register with the exposure positions for transferring these characters in denominational order relation to the film line, like value characters of several sets being concurrently transferred and unlike value characters of several sets being transferred at successive differential intervals of a single said cycle to the film line.

8. A cyclically operable apparatus for photographically recording a plurality of characters in a line upon a film with such characters selected during a single character selecting cycle of a character determining control device, said apparatus comprising a movably mounted carrier bearing a plurality of adjacent similar sets of characters disposed in parallel columns with like characters of the several sets aligned in a transverse row across the carrier, automatic mechanism for continuously moving the carrier to effect a single traverse of all the different characters of said sets across a photographing station during said single character selecting cycle with like, traversely aligned characters simultaneously crossing said station and unlike characters of each of said sets successively crossing said station during said cycle, individual exposure means for each of the character sets, and means under control of the character determining control device for selectively and individually rendering the exposure means effective during said cycle in accordance with each of a plurality of selected characters to cause the concurrent exposure of like characters and successive exposure of unlike characters on a line of the film during said cycle, film feeding means and cyclically controlled means for automatically operating the film feeding means to advance the film a line space after exposure of all characters selected during a cycle.

9. Cyclically operable apparatus to photographically record characters designated in concurrently sensed parallel columns of a record card or the like during traverse of the record card or the like across a sensing station during a single record handling cycle of the apparatus and comprising the combination of a movably mounted carrier for a plurality of adjacent similar sets of characters adapted to be photographed upon a film, automatic mechanism for continuously moving the carrier to effect a single traverse of said plurality of said character sets across a photographing station during a single record handling cycle and so that like characters of the said character sets cross the photographing station concurrently and unlike characters of each of the several sets cross the photographing station successively during such cycle, with each character crossing the photographing station once during each such cycle, individual exposure means for each of the plurality of character sets, and means for selectively and individually rendering the exposure means effective during said cycle in accordance with the characters designated on and sensed in the parallel columns of the record card or the like handled during the cycle to cause the concurrent exposure of like characters from certain of said character sets in accordance with like characters designated in certain columns of the record card or the like and to cause successive exposure of unlike characters from certain of the character sets in accordance with unlike characters designated in columns of the record card or the like, with such exposures occurring as the like and unlike characters of the several sets cross the photographing station once during said cycle while a line of the film remains in position to receive the exposures of the like characters concurrently and the unlike characters successively in transverse portions of the line, and means operating synchronously with movement of the carrier for automatically causing line spacing of the film once each such cycle to present successive lines of the film at character-exposure receiving position during successive cycles.

10. A photographic recording apparatus comprising in combination a rotary drum bearing similar adjacent parallel sets of characters, each set having different characters extending circumferentially on the drum and the parallel sets having like characters extending in alignment across the drum parallel to the axis thereof, automatic cyclic mechanism for continuously rotating the drum to cause like characters of the sets to cross an exposure station concurrently and unlike characters of the sets to cross the exposure station successively during a cycle, with each character crossing said station once during said cycle, multiple character selecting means for selecting characters from a plurality of the sets to be photographed on a line of the film during said cycle and arranged and constructed to select like characters from the sets concurrently and unlike characters successively during the cycle, individual exposure means for each character set, means controlled by the character selecting means for causing the exposure means of the sets from which like characters are selected to operate concurrently for effecting concurrent exposure of such like characters and for causing the exposure means of the sets from which unlike characters are selected to operate successively to effect successive exposures of the unlike characters, with all such exposures of selected characters occurring during said cycle as the characters cross the exposure station, and cyclical means timed with the rotation of the drum for causing automatic line spacing of the film to present successive lines thereof in position during successive cycles to receive the exposures of selected characters.

11. A cyclical photographic recording apparatus in which transient control members, such as record cards, act in automatic succession during successive cycles to automatically determine a new and different selection of a plurality of characters to be photographed on a film during each of such successive cycles and including in combination, a movably mounted carrier bearing adjacent similar series of characters, each series including a group of different characters, automatic cyclic mechanism for moving the carrier to effect a single concurrent traverse across a photographing station of such character groups from the several series during each cycle, with different characters of the groups crossing said station successively during the cycle and like characters of the groups crossing the station concurrently during the cycle, individual exposure means for each character series, means for automatically selectively operating the exposure means during a cycle in accordance with the plural character selection determined by a transient control member during the cycle so as to cause like, selected characters of the character groups to be exposed to a line of the film concurrently and different, selected characters of said groups to be exposed successively during the cycle to the line of the film, and cyclic mechanism for automatically line-spacing the film each cycle to cause characters selected during each cycle to be exposed on a new line of the film.

12. In combination, movable carrier means for a plurality of similar series of different characters arranged so that during a cycle of movement of the carrier means corresponding characters may register simultaneously with an exposure position and different characters of the several series may register successively with the exposure position, automatic, power driven cyclic mechanism continuously moving the carrier means to effect such registration of corresponding characters during the same differential interval and said registration of the different characters of the several series during successive differential intervals of a cycle, means to photo-transfer images of selected characters to a film line as the characters register with the exposure positions, and a plurality of timing means acting in conjunction to selectively time the action of the photo-transferring means so as to transfer only selected characters to a line of a film, one said timing means being differentially effective in response to selected character equivalents to take effect during selected differential intervals and the other timing means being rendered effective by the cyclic mechanism, once each differential interval, to limit the effectivity of the photo-transferring means to definite portions of the selected intervals.

13. A cyclically operable accounting machine comprising movable carrier means for a plurality of columns of different characters, automatic power driven cyclic mechanism continuously moving the carrier means to successively register successive characters of each column with an exposure position during a cyclic period of movement of the carrier means, a light source and lens system for projecting images of characters, one from each column, onto spaced assigned portions of a line of a film, shutters, one for each column, normally conditioned to block transmission of any character image to the film and operable to pass through a character image to the film line, cyclically effective control means selectively responsive to different character call equivalents for causing differential, selective operation of the shutters during a cycle to pass through images of only called characters, one from each column, onto the film line, and cyclical restoring means for commonly restoring the shutters after their operation during a cycle to their normal condition.

JAMES W. BRYCE.